United States Patent [19]
Sabre

[11] 3,871,488
[45] Mar. 18, 1975

[54] ROCK DRILLING

[76] Inventor: Daniel R. Sabre, c/o The Industrial Automation Co., 1520 N. Palethorpe St., Philadelphia, Pa. 19122

[22] Filed: Apr. 4, 1974

[21] Appl. No.: 457,793

Related U.S. Application Data

[63] Continuation of Ser. No. 442,181, Feb. 13, 1974, abandoned.

[52] U.S. Cl................. 175/406, 175/391, 175/393, 175/410
[51] Int. Cl.............................................. E21b 9/22
[58] Field of Search ........... 175/406, 407, 410, 389, 175/390, 391, 394, 415, 395, 418, 385, 327, 402

[56] References Cited
UNITED STATES PATENTS

| | | | |
|---|---|---|---|
| 616,118 | 12/1898 | Kuhne | 175/327 |
| 1,388,490 | 8/1921 | Suman | 175/391 |
| 1,429,041 | 9/1922 | Legate | 175/391 |
| 2,528,300 | 10/1950 | Degner | 175/377 |
| 2,693,938 | 11/1954 | Roberts | 175/406 X |
| 2,705,128 | 3/1955 | McClennan | 175/391 |
| 3,158,216 | 11/1964 | Baron et al. | 175/410 X |
| 3,768,581 | 10/1973 | Rederon | 175/329 |

FOREIGN PATENTS OR APPLICATIONS

| | | | |
|---|---|---|---|
| 851,332 | 10/1952 | Germany | 175/402 |

*Primary Examiner*—Frank L. Abbott
*Assistant Examiner*—Richard E. Favreau
*Attorney, Agent, or Firm*—John R. Ewbank

[57] ABSTRACT

Knife edged cutting members on the conical face and cylindrical side of a rotating drilling head shear slivers of rock by exceeding the tensile strength of the formation being penetrated. Fluid such as air, water, or drilling mud, injected through ports in debris channels between cutting members direct such slivers and other debris upwardly for scouring the bottom of the hole to minimize debris interference with knife edge action. Cutting members are made from a very hard composition such as titanium diboride, boron carbide, boron, and/or mixtures of such hard materials. Guiding members having greater toughness than the cutting members may account for less than one fourth of the wearing surface abraded by the bottom of the hole. Near the bottommost tip, there are fewer cutting and guiding members than at the upper zone of the conical portion.

At one or more locations several diameters above the bottom most vertical cutting members there are a plurality of sets of cutting members defining a diameter slightly smaller than the diameter of the lower most vertical cutting members. Such undersize cutters help to correct minor departures from true verticality, but are inoperative so long as truly vertical drilling continues.

In the method of drilling, the conically arranged knife blades rotatingly cut in a manner which maintains straightness notwithstanding variations in the formations through which the drill is penetrating. The true gauge of the hole is achieved by the lower most cylindrical cutting members. In the event of any slight departure from verticality, the supplemental cutting members designed to be under the gauge of the hole and to cut only in the event of a slight departure from verticality, serve to restore truly vertical cutting. Much horse power can be applied to the flow of the drilling mud which is used for scouring the surface scheduled for cutting. Hence each cutting member encounters a substantially clean surface substantially free from the debris from previous cuttings.

10 Claims, 12 Drawing Figures

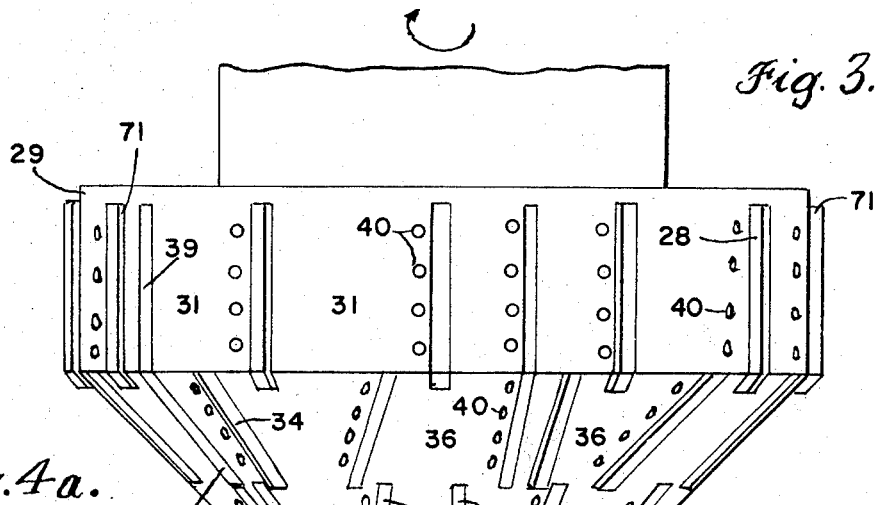
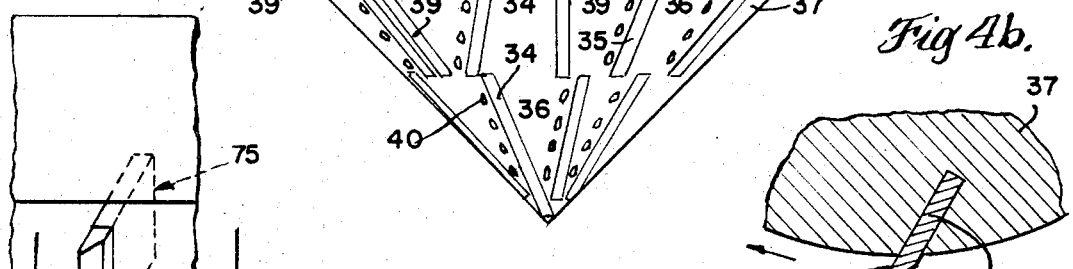
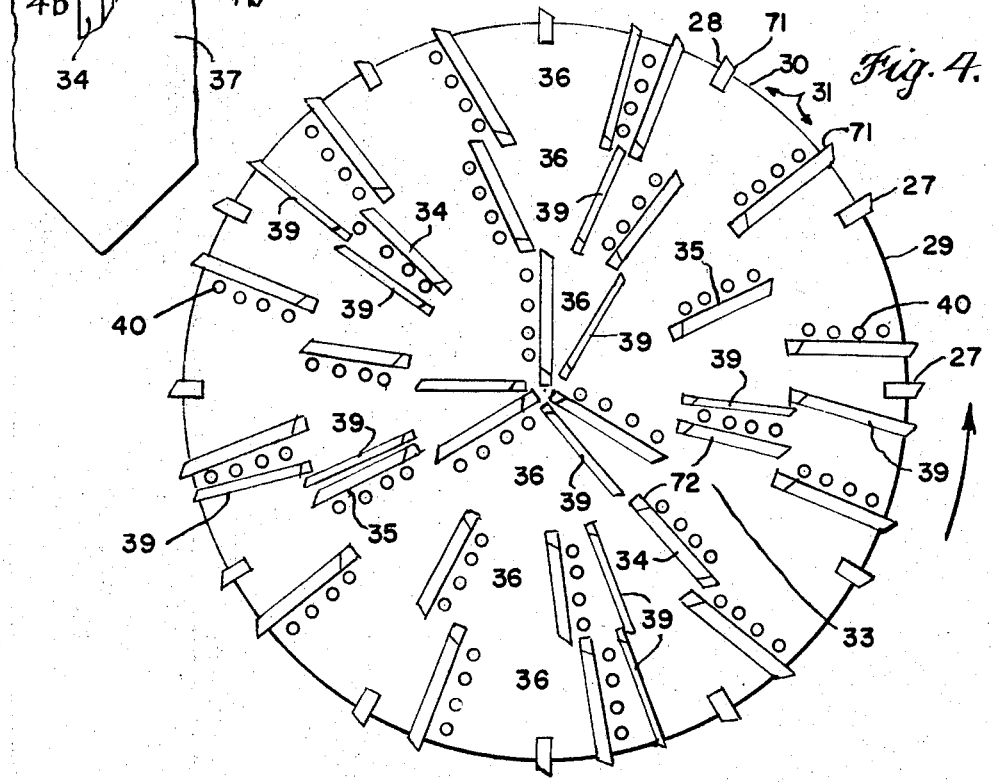

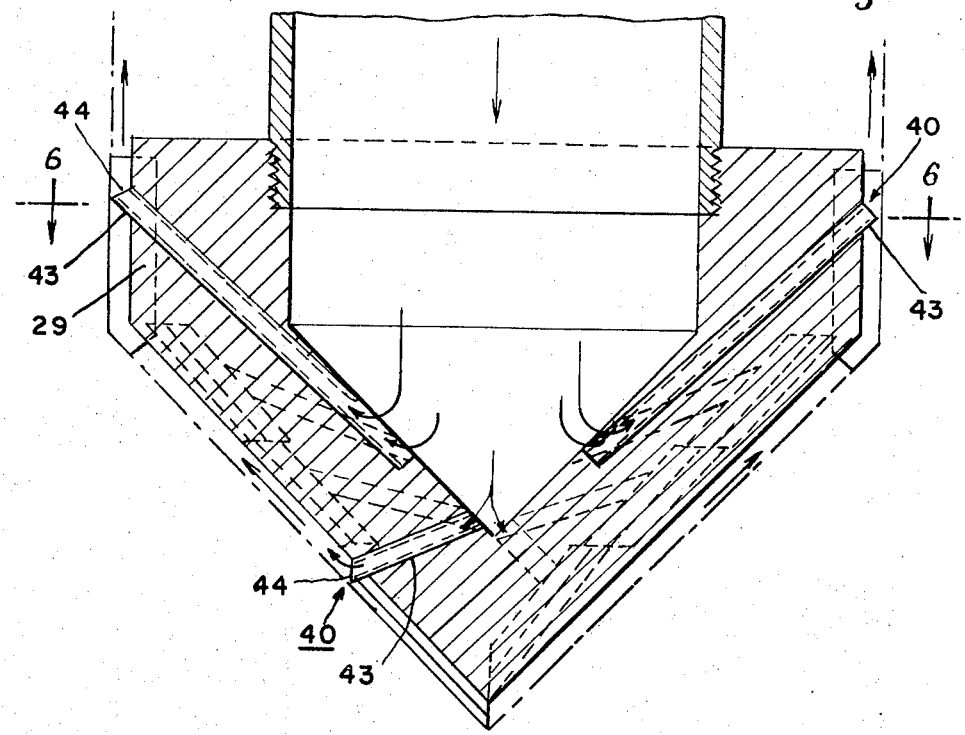
Fig. 5.
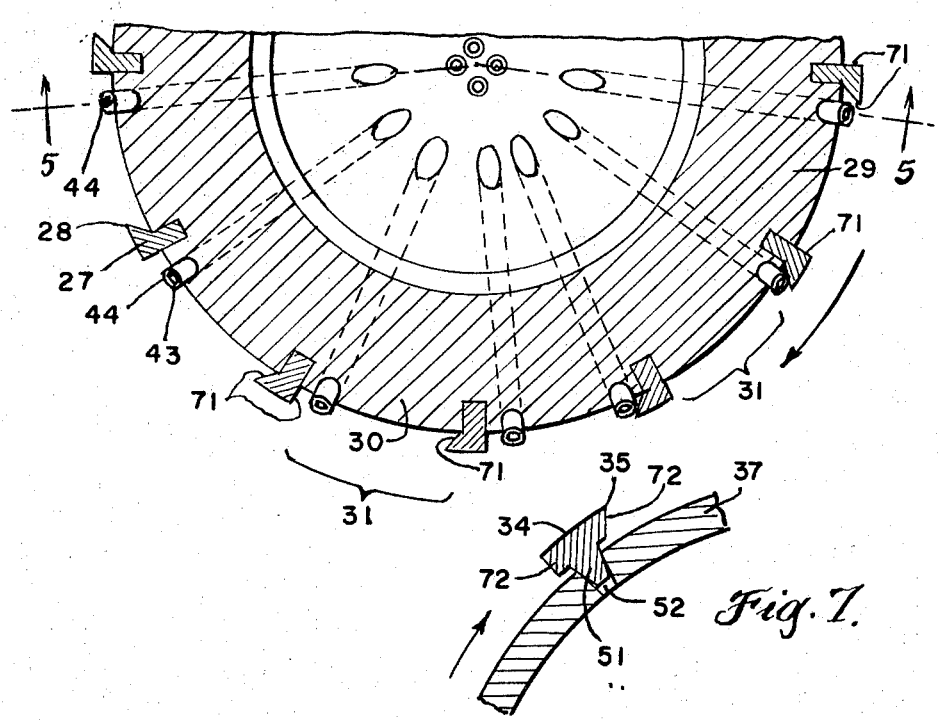
Fig. 6.
Fig. 7.

ROCK DRILLING

CROSS NOTATION OF OTHER PATENT APPLICATIONS

This is a continuation of Ser. No. 442,181, filed Feb. 13, 1974, abandoned concurrently with the filing of this application.

FIELD OF INVENTION

This invention relates to drilling oil wells or other vertical earth drilling. The invention is also concerned with the use of fluid for circulation to the cutting zone and back to the surface processing equipment, with a method of drilling, and the structure of a bit rotating about a vertical axis.

PRIOR ART

In recent decades a large portion of the oil well drilling has been accomplished by tricone bits which bring about a grinding of the bottom of the hole. Diamond bits have been employed for abrading the bottom of the hole. It has not been conventional to employ knife edge cutting of the bottom of a deep well being dug for oil.

The technology relating to use of drilling mud has been influenced in part by the need for having a sufficiently viscous mud to permit easy entrainment of the relatively sizeable granules of rock broken off by the crushing action of the tricone bit.

It is convenient to refer to the bottom of the hole as having a rock-like structure. There are extreme variations amongst rocks, salt having a crushability distinguishable from that of granite, and shale having properties related to relative direction of lamina, and sandstone and limestone having significant variations in porosity, but all rock formations are distinguishable from topsoil formations. Voids occur in the rock being penetrated by an earth drill. If a void embraces the entire cross section of the drill, it can be designated as a vertical variation. If only a portion of the cross sectional area is a void, the horizontal variation imposes problems resembling the more abundant horizontal variations attributable to different hardnesses of rock zones.

All rock has significant compressive strength, but the tensile strength of substantially all rocks is a small fraction of the compressive strength. Any deepening of a hole must be attributable to the application of forces which on a local basis exceed either the compressive strength or the tensile strength of the rock. If the formation of a particle is attributable to the compressive failure of the material, then the particle size removed by a force of a particular magnitude is influenced in part by the compressive strength of the material. Hence, when a rotating bit is exerting compressive failure forces upon a non-uniform cross section of rock, there is a propensity for larger amounts of weak rock to be removed from one zone than the smaller amounts of strong rock removed from another zone. When drilling through horizontal variation zones, the reliance upon compressive failure of the rock inherently leads to variations in the amount of material removed for a single rotation of the bit because of horizontal variations in the structural strength of the rock.

Tricone bits and diamond bits deepen the hole by reason of the compressive failure of the rock subjected to such rotating bits. Accordingly, such bits tend to be diverted from true verticality and to be responsive to the path of least resistance for advancing the bit. The compressive failure pressures, whether exerted by the tricone bit or by a diamond abrading bit, tend to be as deep at the point of action as permissible by the weaknesses of the material being subjected to compressive failure. When the drill encounters a zone having greater softness at one side of the hole than at the other, there are propensities for the drill bit to be diverted and to depart from true verticality. There has been a long standing demand for systems for drilling oil wells without such propensities of the tricone bit to depart from true verticality.

SUMMARY OF THE INVENTION

In accordance with the present invention, the drilling bit features a conical portion having fewer cutting members near the bottom most tip portion of the conical portion than near the upper zone of the conical portion. The rake angles of a knife edge exert a cutting and lifting action whereby a sliver of rock is removed from the bottom of the hole by a shearing action attributable to exceeding the tensile strength of the rock. Such cutting of a sliver of a rock by the rotating conical knife edge does not require any compressive failure of the rock, and hence the depth of the local action is not attributable to the strength or weakness of the local material. Precautions are taken to assure the cutting of uniform thickness of rock at every angle of rotation and throughout the height of the conical portion. Thus the reliance upon shearing and the control of the thickness of the cutting assure true verticality of the drilling through zones having rock formations of a non-uniform cross section.

The rotation of the conically arranged knife edges enhances the propensities of the bit to drill an accurately vertical hole notwithstanding horizontal variations in the formation penetrated by the bit. The existence of a void or softer zone at a portion of the path of the bit does not prompt the bit to be diverted from true verticality because such zone of softness is cut at the same rate as zones of hardness at the same level. At each depth of the well drilling, the depth of cut and speed of hole drilling are limited by the zone of maximum hardness without diversion from zones of relative softness.

in preferred embodiments, a plurality of guiding members are secured to the conical portion. The guiding members are constructed of material having greater toughness and less brittleness. Although the material of a guiding member is more readily abraded than a cutting member, the wearing surfaces of both cutting and guiding members are worn away at a uniform rate. The number and/or wearing surface area of guiding members is less than about one-third of that of the cutting members. The guiding members are arcually spaced from each other and from the cutting members to maximize rotational balance and to decrease the likelihood of malign or destructive vibration in the event of at least partial destruction of a random portion of the cutting members. Above the conical portion is a vertical cylindrical portion, having a plurality of cutting members with cutting edges having a significant vertical component. The arcual spacing and width of the cutting members are adapted to increase the likelihood of acceptable rotational dynamic balance and to decrease the likelihood of destructive vibration (sometimes called malign vibration) during rotation of a bit at any stage of its use.

The zone between adjacent members (cutting members and/or guiding members) is designated as a debris channel. The connecting surface of a debris channel extends from the sidewall of one member to the sidewall of another member. The minimum width of a debris channel is about 5 millimeters and widths up to about 50 millimeters are acceptable. The cutting members are advantageously constructed of boron carbide, boron nitride, boron, titanium diboride, silicon nitride, mixtures thereof, or related extremely hard material having the toughness and related characteristics appropriate for knife edge cutting members.

All embodiments of the invention feature a plurality of ports adapted to permit the injection of a fluid into a debris channel for cooling a knife edge and for urging debris away from the knife edges and upwardly toward the debris channels within the vertical cylindrical portion of the bit. There are a great number of ports. Said multiplicity of fluid ports and said upward directional flow of fluid in the debris channels of the conical portion permits significant scouring power to be exerted on the bottom of the hole without troublesome propensities for uplifting said rotating bit. The cross sectional area through which the fluid is injected at a port is small with respect to the large cross sectional area of the effluent portion of the debris channel system. Thus there is relatively low frictional resistance to the flow of fluid from a port near the tip of the cone to the effluent zone above the cylindrical portion of the bit.

In various modifications of this invention there are preferred features such as the use of about 90° for the solid angle of the conical tip. In achieving rotational dynamic balance, some embodiments feature cutting members having uniform weight and widths and uniform arcual spacing therebetween, thus simplifying the engineering for the meeting standards on a freshly manufactured bit. Preferred embodiments are engineered to minimize malign vibration throughout the entire life of the bit, including periods after portions of the cutting members have been worn or broken away, featuring cutting members having weights, widths, etc. which differ and with nonuniform arcual spacing between members.

BRIEF DESCRIPTIONS OF THE DRAWINGS

FIGS. 1, 3, 4, 5, and 6 concern conical portions which sufficiently resemble each other that a common numbering system is appropriate.

FIG. 3 is a schematic side view of a portion of a drill bit.

FIG. 4 is a bottom view of a bit.

FIG. 4a is a schematic representation of the anchoring of a knife member in a rectangular socket having an angular direction differing from perpendicular so that cutting forces urge the member into the socket.

FIG. 4b is a sectional view taken on line 4b—4b of FIG. 4a.

FIG. 5 is a schematic sectional view of a portion of a bit taken on line 5—5 of FIG. 6.

FIG. 6 is a schematic sectional view of a portion of a bit taken on line 6—6 of FIG. 5.

FIG. 7 is a schematic sectional view further clarifying the manner in which a conically tapered interference fit can anchor a knife edge member to a structural member.

Figure 8:
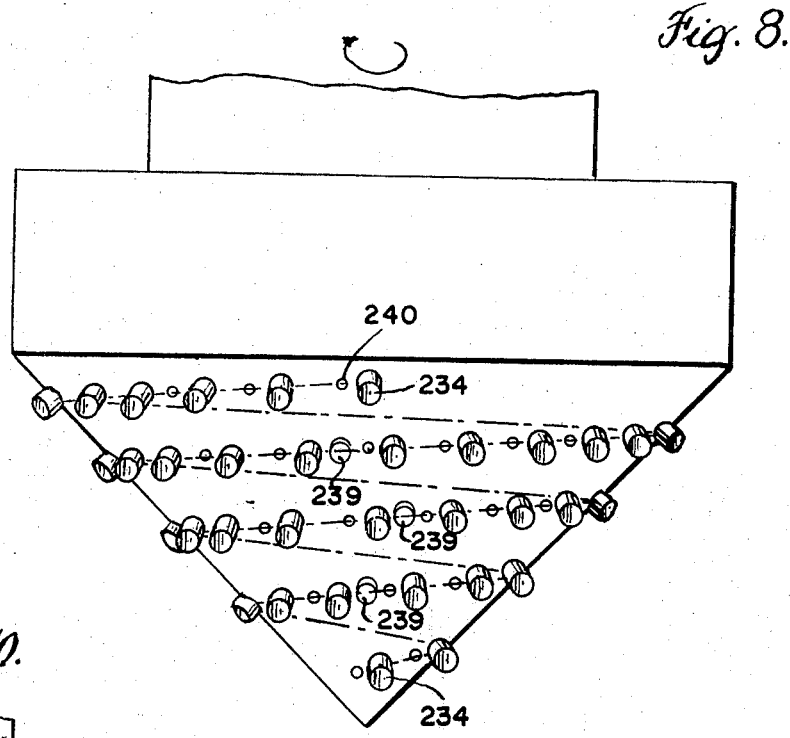
Figure 10:
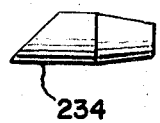

FIG. 8 is a schematic view of a modification of the conical portion of the bit in which a conical array of cutting and guiding members of a type shown in FIG. 10 are positioned along a conically spiral path.

Figure 9:
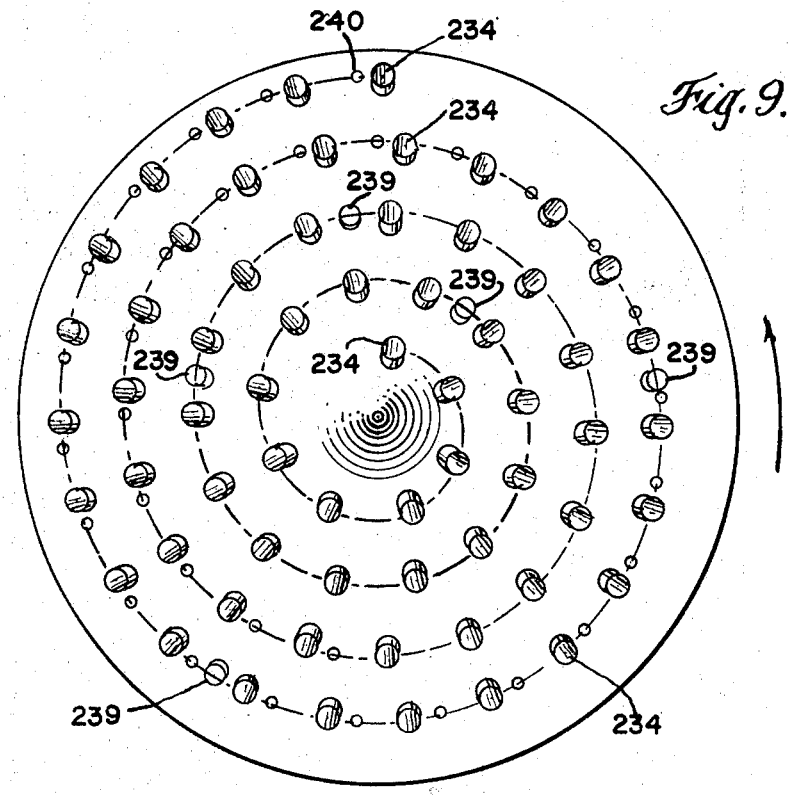

FIG. 9 is a bottom view of FIG. 8.

FIG. 10 is a guiding or cutting member of FIGS. 8 and 9.

In FIGS. 1, 3, 4, 5, and 6, a drill bit 20 includes elongated shaft means 21, two reamer portions 22, 23, and a cutting head 24. Such bit 20 is secured to the drilling stem, not shown. The cutting head 24 comprises a cylindrical portion 25 and a conical portion 26. Cutting members 27a, 27b, etc., on the cylindrical portion 25 have knife edges 28 (FIG. 4) defining the gauge diameter drilled by the bit. Such cutting members extend outwardly from a structural member 29. Sidewalls 71 of adjacent cutting members 27 combine with a connecting surface 30 therebetween to provide a debris channel 31. The upflowing fluid such as drilling mud, being recirculated to the drilling rig at the surface can flow in the debris channels 31. That is, the fluid can flow upwardly in the zones between the cutting members, and such plurality of generally free paths are designated as debris channels 31.

Just below said cylindrical portion 25 is the conical portion 26, particularly stressed in the present invention. Such conical portion 26, features a solid angle 32, (FIG. 1) within the range of about 60° and about 120°. Said solid angle is desirably between 85° and 95° and preferably exactly 90°. A channel connecting surface 33 (FIG. 4) combines with a sidewall 72 of a cutting member 34 to provide a debris channel 36 on the conical portion 25. The cutting members 34, have knife edges 35 which do a significant portion of the cutting of the bottom of the hole so that the array of cutters 27 on cylindrical structural member 29 do relatively little cutting in making the hole more nearly perfect. Cutting members having knife edges aligned with both cylindrical knife edges 28 and conical knife edges 35 can help to cut the circular-conical boundary zone and are conveniently classified with either or both. A single cutting member can have portions identified respectively as cylindrical (27) conical (34) and boundary cutting portions. Conical cutting members 34 extend from a conical structural member 37 (FIG. 3) providing the connecting surfaces 33 of debris channels 36.

In certain preferred embodiments, guiding members 39 (FIGS. 3 and 4, but not FIG. 1) are positioned on the conical structural member 37, and are constructed of a material which is softer but significantly tougher and less brittle than the cutting members 34. Nylon, tetrafluoroethylene, polyurethane rubber, aluminum, and steel are suitable materials for the dummy teeth or guiding members 39, the sidewalls of which are also designated as 72 because of helping to form conical debris channels 31. The cutting members 34 are harder than guiding members 39. If the cutting members 34 are very hard (e.g. boron carbide) then the softer guiding members may be moderately hard (e.g. tungsten carbide). In the event that the cutting operation leads to the breaking off of a portion of one or more of the cutting members 34, then the guiding members 39, can help to maintain the conical surface of structural member 37 at the correct distance from the bottom of the hole and can help to maintain the dynamic balance of the rotating bit. The number of guiding members 39 generally should not exceed one third the number of conically aligned cutting members 34. The wearing surface area ratios are sometimes even more significant than the number ratios. The area of the cutting members 34 should be at least three times greater than the wearing area of the guiding members 39.

A smooth cutting operation is dependent in part upon an acceptable degree of rotational dynamic balance. In the event of malign vibration, attributible to the imbalance of the rotating bit in relation to the hole, smooth cutting is radically impaired. The torsional oscillation components of the rotary cutting complicate maintenance of satisfactory dynamic balance. The long length of driveshaft permits uniform angular speed at the engine to be translated into variable angular speeds at the cutting bit because of variations in ease of cutting, conveniently described as the torsional oscillation components of the cutting motion.

The arcual distance between the cutting members are selected to maximize the dynamic balance. To achieve acceptable dynamic balance on the factory-produced unused bit, the simplest engineering approach involves using, at each level of the cutting head 24, a circumferential set of equally spaced equally weighted, and equal width members (27, 34, and 39.) During use, a random portion of cutting members 34 may become adversely chipped, damaged, or broken off. By having cutting members 34 of different widths and different weights, and by including guiding members 39 of different weights and widths, dynamic balance is attainable with nonuniform distances between members, and such arrangement maximizes dynamic balance portentialities under a great variety of conditions likely to be encountered in total usage of the bit until it is so worn as to merit replacement. The guiding members 39 are not brittle, are not readily chipped, and prevent a chipped bit from cutting a troublesomely thick sliver.

In all embodiments of the invention, a plurality of ports 40 are adapted to permit the circulation fluid, such as an aqueous suspension of clay designated as a drilling mud, to flow through the cutting zone. Water or air or other fluids are sometimes suitable cooling fluids in lieu of drilling mud. Many of the ports 40 can be positioned in the debris channels 36 of the conical portion 26.

The arcual distance between cutting edges 35 of conical cutting members 34 are generally within a range from about 10 to about 60 mm. The width of a debris channel will generally vary from about 5 mm to about 50 mm.

Ports 40 in the debris channels 36 in the conical portion 26 serve to urge the fluid and debris upwardly toward the cylindrical portion 25. In preferred embodiments, it is advantageous to provide tubes 43 (FIGS. 5 and 6) extending from connecting surface 30 so that an opening 44 in tube 43 can direct the jet of fluid from port 40 in an upward direction to the stream in the debris channel 31. The upward direction of the streams from the conical array of ports 40 tends to eliminate any propensities of drilling mud to uplift the bit. Because of the scouring action promoted by the flow of the fluid from ports 40, each knife edge 35 of conical cutting member 34 cuts a scoured clean bottom of the hole, and thus avoids the propensity for churning a thick layer of debris at the bottom of the hole.

In certain embodiments of the invention, a cutting member 34 is anchored to the conical structural member 37 by a tapered interference fit. An opening 52 in the structural member 37 has a controlled taper such as within a range from about 0.016 inch per inch to about 0.020 inch per inch, but not more than about 2°. The shaft portion 51 of a cutting member has the identical taper selected for the opening 52. When the shaft 51 is forced into the hole 52, a conventional interference fit is achieved. A cutting member 34 may have two or more shaft portions 51 linearly spaced from each other.

Figure 1:
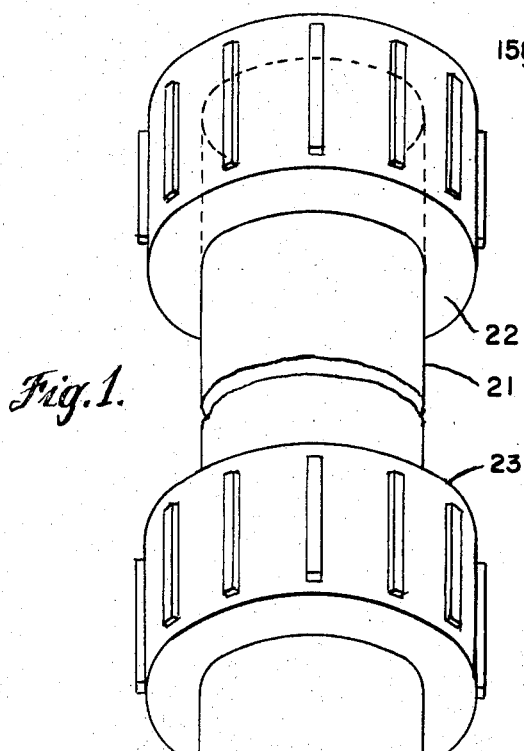
FIG. 1 is a perspective view of a drill bit.
Figure 2:
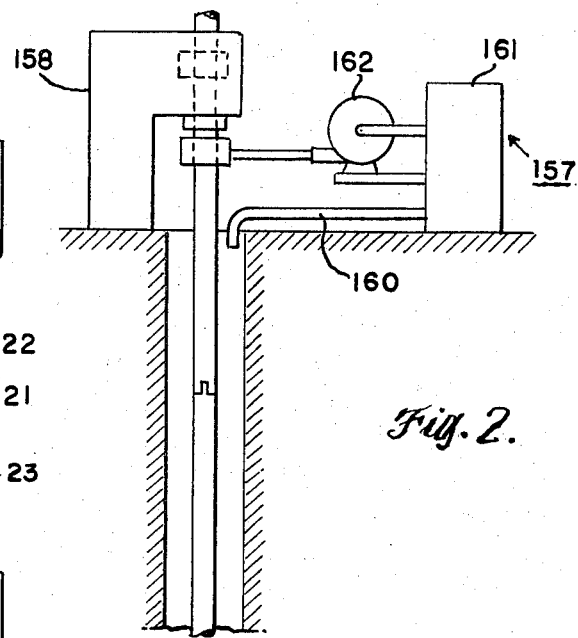
FIG. 2 is a schematic view of an oil well being drilled.

As shown schematically in FIG. 2, a vertical hole 154, such as a well drilled in hopes of recovering oil, penetrates through thousands of feet of rock formation 155. The bottom 156 of the hole 154 is conically shaped by the conical portion 124 of the drilling head 120, the number for FIG. 2 being 100 greater than in FIGS. 1, 3, 4, 5, 6 and 7, for corresponding parts. At the earth's surface, an appropriate rig 157 provides the power and other services for the remote operation of drilling head 120. Rotating means 158 permits incremental additions of unit lengths of axial stem pipe 159, through which drilling mud is pumped downwardly to the drilling head. Drilling mud flows upwardly and is directed through conduit 160 to a reprocessing unit 161, adapted to remove debris by filtration, etc., and is presented by pump 162 for recirculation to the drilling head 120.

In certain embodiments of the invention, and as shown in FIGS. 4a and 4b, a rectangular socket 75 is provided for a cutting member 34. In most manufactured articles, sockets are designed to be substantially perpendicular to the adjacent surface, but sockeet 75 is non-perpendicular in order to transform both the rotating force and the cutting forces into forces tending to urge the cutting member into, instead of out of, the socket 75. As shown in FIG. 4b, socket 75 is not radially aligned, but at an angle thereto so that as structural support 37 rotates, cutting member 34 is urged into, instead of out of socket 75. Similarly, as shown in FIG. 4a, the socket 75 is not radially aligned, but so that the downward pressure upon cutting member 34 tends to urge the cutting member into instead of out of socket 75.

An alternative embodiment shown in FIGS. 8, 9, and 10 features a considerable abundance of members 234, 239, arranged along a generally spiral path from the conical tip to the top of the cutting zone, and with the cutting members 234 spaced sufficiently close together that rotation of the drillhead provides overlapping of the cutting action. Thus each level of the bottom of the hole is acted upon by a plurality of cutting members 234. Each cutting member is fitted into a tapered hole, as shown in FIG. 10. Each cutting member 234 has a tapered shaft 251 adapted to fit into a tapered hole in a structural member. Ports 240 direct fluid to cool cutting edges and to remove debris upwardly.

As shown in FIG. 4, certain embodiments of the invention employ cutting members 34, 27 which are not radially aligned, but angularly displaced from the radial position. Such variety of knife edge alignments helps to preserve dynamic balance, particularly after any accidental destruction of a portion of a cutting member.

Ports 60 are desirably positioned to direct the stream of fluid (e.g. drilling mud, compressed gas, or any of the other cooling and cleaning fluids employed in drilling oil wells) into the gullet zone adjacent a knife-like cutting edge 35. A plurality of ports 40 may cool a single knife edge 35. Relatively soft guiding members 39 may not require such cooling, but ports 40 may be positioned near guiding members to assure upward flow of the debris cut by the bit.

Various modifications of the invention are possible without departing from the scope of the invention as set forth in the claims, the embodiments shown in the drawings being merely illustrative of appropriate variations of the improved apparatus and method.

The invention claimed is:

1. In an earth cutting bit, the combination of:
a vertically aligned shaft portion;
a drilling head portion;
a vertical cylindrical portion in said drilling head;
a plurality of cutting members secured to said cylindrical portion to provide knife-like cutting edges having a generally vertical direction, the arcual distances between cutting members being greater than 5 millimeters, said distances being adapted to minimize the likelihood of malign vibration during rotation of the bit, said cutting members having relatively hard composition;
vertically aligned debris channels between the cutting members on the cylindrical portion, said debris channels accommodating the flow upwardly of a stream of fluid containing entrained debris removed in drilling the hole, there being an effluent zone from the debris channels at the upper portion of said cylindrical portion each cross section of a debris channel comprising two sidewalls and a connecting surface;
a conical portion beneath said vertical cylindrical portion in said drilling head the tip of such conical portion being bottommost and coaxial with the entire bit, the maximum diameter of the conical portion being integral with the bottommost portion of the cylindrical portion;
cutting members on the conical portion, said cutting members having knife-life cutting edges, there being fewer cutting members near the conical tip than near the cylindrical portion of the bit, the rotation of said conical portion enhancing the propensities of said bit to drill a vertical hole notwithstanding variations in the formations penetrated by the bit, the arcual spacing between the cutting members being greater than 5 millimeters, the distances between cutting members being adapted to decrease the likelihood of malign vibration and the zones between cutting members being conically aligned debris channels, there being more debris channels at the upper portion of the conical portion than at the tip, the upper portion of the system of conically disposed debris channels feeding streams of fluid containing entrained debris to the system of debris channels on the cylindrical portion;
a plurality of ports within the debris channels, said ports being adapted to direct jets of fluid for urging debris generally upward toward the effluent zone from the debris channels, said flow of fluid having effectiveness in scouring the hole being drilled, whereby a significant portion of the cutting edges act upon surfaces previously scoured to substantially debris free condition, the fluid from said ports effectively cooling the cutting edges of the cutting members by reason of the controlled directional flow of the fluid, and whereby the debris-containing fluid is directed through the debris channels by relatively low resistance pressure routes toward the effluent zone and whereby the debris does not clog the zone adjacent a channel sidewall helping to form a knife-like cutting edge and whereby troublesome deposits of debris do not accumulate on a connecting surface of a debris channel and whereby significant scouring power and fluid pressure can be applied without troublesome uplifting propensities upon the rotating bit.

2. The earth cutting bit of claim 1 in which the cutting members are constructed of a material selected from the group consisting of boron nitride, titanium diboride, boron carbide, boron, silicon nitride, and mixtures thereof.

3. The earth cutting bit of claim 1 in which a cutting member is secured in a socket the walls of which are so directed that when the walls of the stem of the cutting member are adjacent thereto, the drilling operation imparts forces urging the stem of the cutting member deeper into such socket.

4. The earth drilling bit of claim 1 in which a cutting member is anchored to a structural member by an interference fit of a conically tapered stem portion of the cutting member.

5. The earth cutting bit of claim 1 in which a plurality of cutting members are arrayed along a conically spiral path adapted to provide the cutting action of a plurality of cutting members at each horizontal level of the rotating conical portion.

6. The earth cutting bit of claim 1 in which the solid angle of the conical portion is substantially 90°.

7. The earth cutting bit of claim 1 in which at least one circumferential set of a plurality of generally vertical cutting members are positioned at a cylindrical portion significantly higher than the next lower circumferential set of vertical cutting members, each of the higher sets of vertical cutting members on the cylindrical portions having a cutting diameter slightly less than the cutting diameter of the lowermost set of generally vertical cutting members, whereby the higher cutting members can provide corrective cutting in the event of slight departure from verticality of the hole cutting but do no cutting during normal vertical deepening of the hole.

8. The earth cutting bit of claim 1 in which some of the conically arrayed cutting members are angularly different from upwardly radial arrangement.

9. The earth cutting bit of claim 1 in which there are on the conical portion a plurality of guiding members aligned between cutting members, the guiding members being constructed of a material more readily abraded, tougher and less brittle than the cutting members, the number of guiding members being less than about one third of the number of cutting members, and the wearing surface area of the guiding members being less than about one third of the wearing surface area of the cutting members, such wearing surfaces being the portions contacting the conical bottom of the hole and the guiding members being arcually spaced from each other and from the cutting members to decrease the likelihood of malign vibration in the event of at least partial destruction of a random portion of the cutting members, the guiding members extending from the connecting surface of debris channels a thickness the same as the thickness of the cutting members, whereby rotation of the wearing surface of the guiding members defines a diameter corresponding generally to the diameter of the wearing surfaces of the rotating cutting members.

10. The earth cutting bit of claim 9 in which the guiding members are constructed of a material selected from the group consisting of nylon, tetrafluoroethylene, polyurethane rubber, aluminum, and steel.

* * * * *